Aug. 29, 1944.    K. A. HOLST    2,357,199
SHIP'S SPEED INDICATOR
Filed April 5, 1943    3 Sheets-Sheet 1

Aug. 29, 1944.  K. A. HOLST  2,357,199
SHIP'S SPEED INDICATOR
Filed April 5, 1943  3 Sheets-Sheet 2

INVENTOR
Knute Arnold Holst
BY
James C. Marble
ATTORNEY

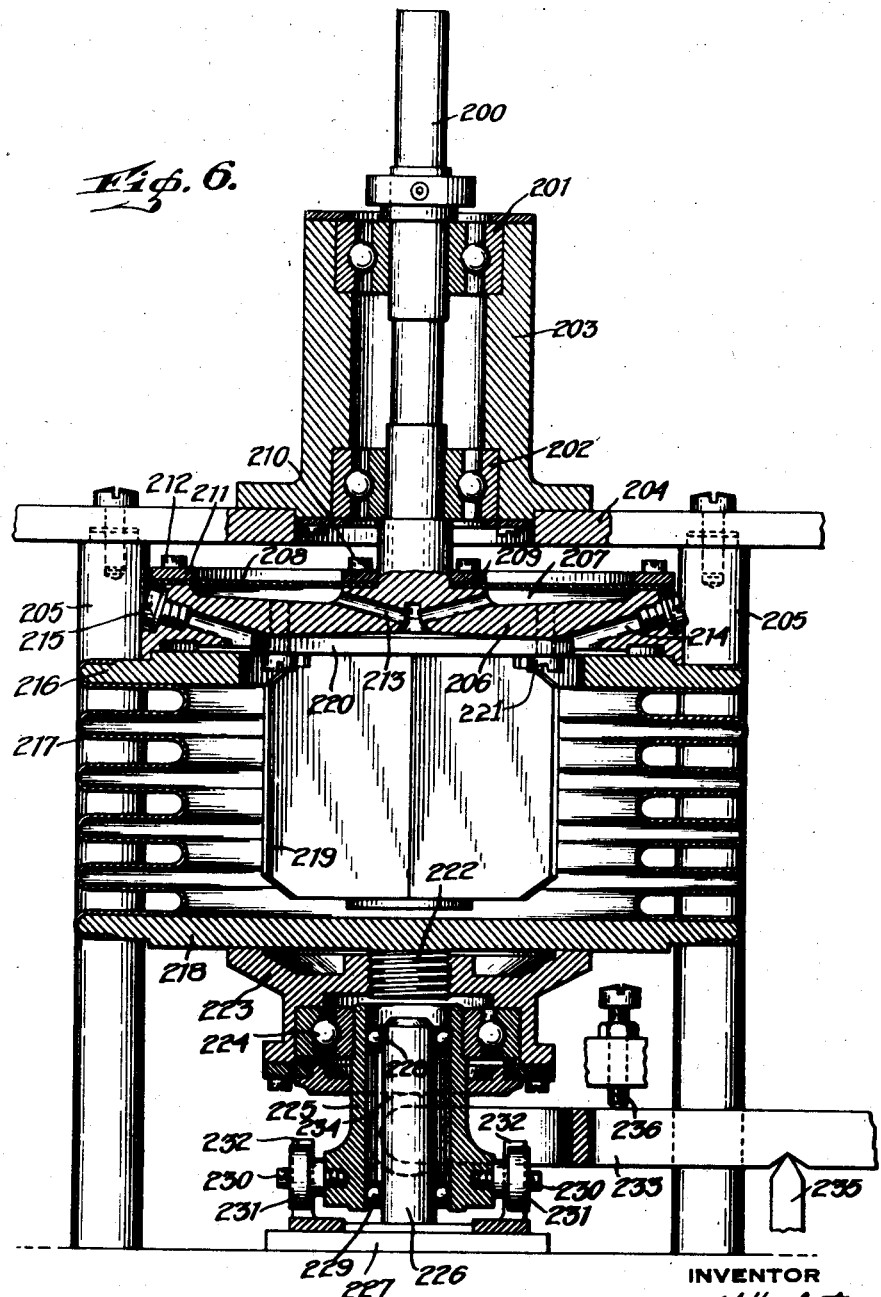

Patented Aug. 29, 1944

2,357,199

UNITED STATES PATENT OFFICE 2,357,199

SHIP'S SPEED INDICATOR

Knute Arnold Holst, Astoria, N. Y., assignor to Pitometer Log Corporation, New York, N. Y., a corporation of New York Application April 5, 1943, Serial No. 481,928

3 Claims. (Cl. 73—205)

The present invention relates to indicators and has particular reference to indicators for measuring the velocities of fluid flow, either through a conduit or relative to a body moving through the fluid such as a ship moving through water. Still more particularly, the invention relates to that class of indicators in which a force varying in accordance with the square of the variation in velocity of the fluid flow is balanced by a force varying in accordance with the square of the speed of operation of a device, the speed of which is utilized to indicate as a linear function the velocity of flow of the fluid to be measured.

It has heretofore been proposed in systems of the above general class to balance the force derived from a differential Pitot tube or venturi against the force developed by a centrifugal governor, the former force varying as the square of the velocity of the fluid and the latter force varying as the square of the speed of the governor. With such forces balanced by properly controlling the governor speed, the desired velocity reading is then obtained as a linear function of the governor speed.

If a device of the kind under consideration is to be of maximum utility, the balancing of the opposing forces must be accomplished with the greatest possible degree of stability and the minimum of "hunting" on the part of the device producing the balancing force. A centrifugal governor is not inherently suitable for this type of use, since speed variations result in changes in the effective radius of the weight or weights employed, and this, for reasons which are known and need not be detailed herein, tends to promote hunting, particularly when the governor force is opposed by a force having a constant characteristic regardless of displacement.

It is, therefore, the general object of the present invention to provide an improved form of apparatus of the character described in which novel mechanism is employed for creating a relatively more stable balance of forces than has heretofore been obtainable. Other and more detailed objects will appear as this description proceeds.

For a more detailed understanding of the nature of the invention and the manner of its use reference may best be had to the following description of suitable examples of apparatus for carrying the invention into practice, taken in conjunction with the accompanying drawings in which:

Fig. 6 is a cross-sectional view of another form of a device embodying the invention and adapted to form a part of the organization shown in Fig. 1.

Since apparatus embodying the invention is well suited for indicating the speed of ships, in other words, as a ship's log, it will be described herein as applied primarily to that use, but it will be understood that within the scope of the invention other uses are contemplated.

Figure 1:
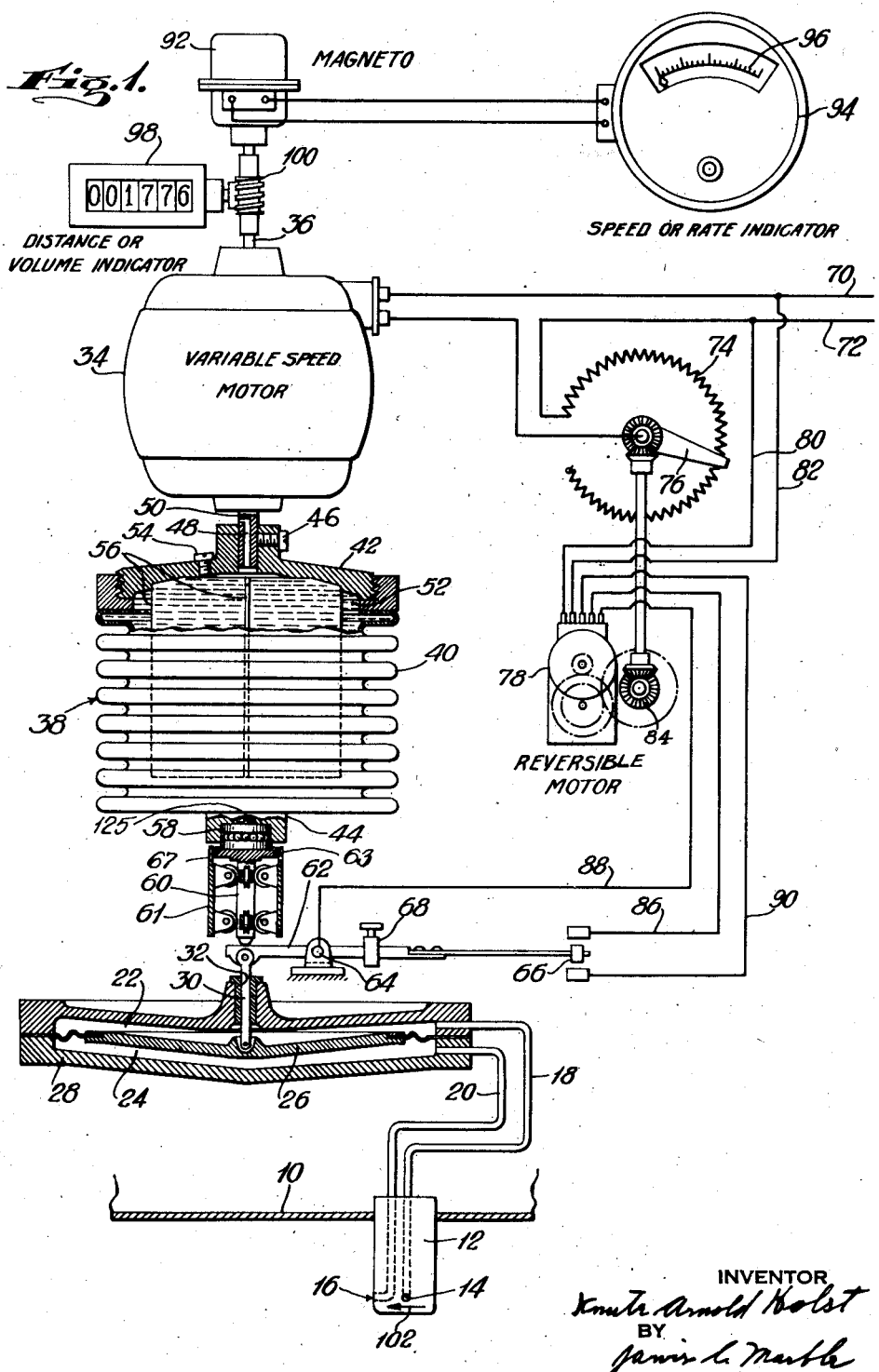
Fig. 1 is a diagrammatic view showing one form of indicator embodying the invention, certain of the novel parts being shown on disproportionately large scale.

Referring now more particularly to Fig. 1, 10 indicates the portion of the hull of a ship from which projects a differential Pitot member 12 of known form having a static pressure orifice 14 and a dynamic pressure orifice 16. Orifices 14 and 16 are connected, respectively, by static and dynamic pressure lines 18 and 20, to chambers 22 and 24 on the opposite sides of a movable diaphragm 26 mounted in a diaphragm casing 28. A pin 30 attached to the diaphragm 26 and passing through a suitable packing 32 in casing 28 serves to transmit force derived from the diaphragm 26.

A variable speed electric motor is indicated at 34 and has secured to its driving shaft 36 a liquid actuated force producing device indicated generally at 38. This device consists of a deeply corrugated bellows member 40 which may advantageously be of the well known "Sylphon" type, attached at its end to end members 42 and 44. The end member 42 is secured as by means of a set screw 46 to the motor shaft 36, and the latter is provided with an axial bore 48 communicating with a vent opening 50 for placing the chamber 52 within the bellows in communication with the atmosphere. Chamber 52 is substantially filled with any suitable liquid, preferably one of low viscosity and having the least possible tendency to evaporate.

The end member 42 is provided with one or more filling plugs 54 and carries a number of radially disposed fins or vanes 56 extending into chamber 52 but out of contact with the bellows 40 and the opposite end member 44.

The end member 44 carries a thrust bearing 58, one race of which is attached to an axially extending force transmitting pin 60 suitably guided in a roller guide indicated generally at 61. Rotation of the pin 60 and the lower race of the bearing 58 is prevented by rollers 63 rotatably mounted on stub shafts 65 which extend radially from the enlarged upper end of pin 60. As the pin moves up and down the rollers 63 roll against the walls of slots 67 formed in fixed members, while the engagement of the rollers with these walls prevent rotation of pin 60, which rotation might tend to cause the pin to bind in the roller guide 61.

The pin 60 is arranged coaxially with respect to the diaphragm pin 30 and the two opposed pins act on one arm of a lever 62 pivoted at 64 and providing on its other arm a contact 66 for controlling electric circuits hereinafter to be described. Lever 62 also advantageously is provided with an adjustable balancing weight 68.

Motor 34 is operated by current from a supply line the leads of which are indicated at 70 and 72, one of which includes a rheostat 74 having a control arm 76. A reversible motor 78, energized through leads 80 and 82 from the supply line, acts through a suitable gearing, indicated generally at 84, to control the position of the rheostat arm 76. Control of motor 78 is effected by the contact 66, which if moved to a position closing the circuit comprising leads 86 and 88 causes the motor 78 to operate in one direction and if moved to a position closing the circuit comprising leads 86 and 90 causes the motor to operate in the opposite direction. With contact 66 in neutral position, as shown, motor 78 is stationary.

Shaft 36 of motor 34 drives a magneto 92, the voltage developed by which is proportional to its speed of operation, such voltage being registered by a voltmeter 94 the scale 96 of which may be calibrated directly in terms of speed of the Pitot member 12 through the water. Advantageously, the shaft 36 also operates a revolution counter 98 through a worm drive 100. The counter can be calibrated to read directly in terms of distance traveled.

The operation of the above described apparatus is as follows, assuming the ship with its Pitot member 12 to be moving through the water in the direction of the arrow 102. The static water pressure is conducted to chamber 22 from orifice 14 and the combined static and dynamic pressure at orifice 16 is conducted to chamber 24.

The differential pressure, representing the dynamic head due to the movement of the Pitot member, is thus transmitted to pin 30, tending to move it upwardly as seen in the figure. The value of the force tending to move pin 30 varies as the square of the speed of movement of the Pitot member 12.

Motor 34 is assumed to be operating and as a result of the rotation of the bellows member the liquid in chamber 52 is subjected to centrifugal force, since owing to the fins 56 the liquid is also rotated. The force acting on the liquid creates an internal fluid pressure tending to expand the bellows in axial direction, imposing on pin 60 a force varying as the square of the speed of rotation of the bellows. Since the force acting on pin 30 varies as the square of the speed of the Pitot member and the force acting on pin 60 varies as the square of the speed of motor 34, it is evident that the speed of the latter will be directly proportional to the speed of the Pitot member if the forces acting on the two pins are exactly balanced. With the parts as shown in the figure, the speed of motor 34 is assumed to have been regulated so that these two forces are in balance and under such condition the speed of the ship can be read directly on the scale 96. Now let it be assumed that the ship's speed increases. This results in an increase in the pressure due to velocity head acting on pin 30 and momentarily upsets the balance between the forces acting on pins 30 and 60. Contact 66 is moved by the displacement of the bellows and the diaphragm caused by the unbalance, to close circuit 88—90. The closing of this circuit actuates motor 78 in a direction causing the rheostat arm to move so as to reduce the resistance in the circuit energizing motor 34. This motor then speeds up until the resulting increase in force acting on pin 60 due to augmented centrifugal force operates to move contact 66 to open circuit 88—90 and deenergize motor 78. This stops actuation of the rheostat and stabilizes operation of motor 34 at the new speed which is proportional to the new speed of the ship.

Upon decrease in ship's speed the action is essentially as above described, with the speed of motor 34 being decreased through the momentary energizing of circuit 86—88 to increase the resistance in the circuit supplying motor 34.

Insofar as the present invention is concerned, the specific means constituting the system for regulating the motor speed in response to an impulse occasioned by unbalanced control forces may be varied widely, several such systems being known in the art and the one herein above described and involving the use of a reversing motor and rheostat not being new per se.

It will be apparent however, that given a satisfactory motor control system, a condition readily fulfilled by known constructions, the accuracy and stability of the indicator as a whole is dependent upon the mechanism for producing accurate and stable square law forces to be balanced against each other and in accordance with the present invention greatly improved accuracy of control and freedom from hunting is obtained by the employment of the rotating liquid filled device for producing the square law balancing force derived from the motor whose speed is indicative of the value of that which is to be measured. Functionally, one important reason is due to the fact that the mechanism does not involve radial movement of any of the masses involved. Thus we have the centrifugal force developed dependent only upon operating speed, and account need not be taken of change in radius of a rotating governing mass, as in the case of a centrifugal governor the radius of which must change if regulating movement of the governor is to be obtained. While the tendency of centrifugal governors to hunt due to their inherent characteristics have been reduced by refinements of design, this involves the employment of additional mechanisms of return motion or other nature for applying restoring forces. The necessity for such additional controls is particularly required if the governor is to work, as in the present instance, against a force producing means wherein displacement per se of the force producing element does not affect the value of the force produced.

On the other hand, the present mechanism, which uses the centrifugal force developed by a rotating body of liquid having a radially fixed position to produce an axially acting force, is ideally suited for balancing a force produced by means which is not affected by displacement. Moreover, the desired end is accomplished by apparatus which is simple and relatively cheap to manufacture, which is rugged in nature, does not depend upon the use of springs and which avoids to the maximum extent the variables due to variations in friction in moving mechanical joints.

In the apparatus shown in Fig. 1, the bellows is of what may be termed an open type, that is, the chamber containing the liquid is in open communication with the atmosphere. Such communication is provided in order to enable the bellows to expand without introducing any force due to the creation of a partial vacuum in the liquid chamber.

Figure 2:
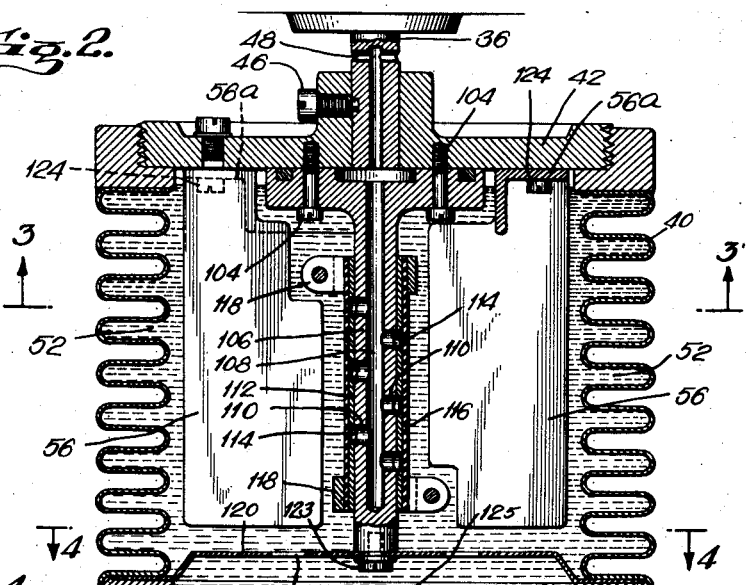
Fig. 2 is a central sectional view, on much larger scale, of a different form of a device embodying the invention and adapted to form a part of an organization of the kind shown in Fig. 1.
Figure 4:
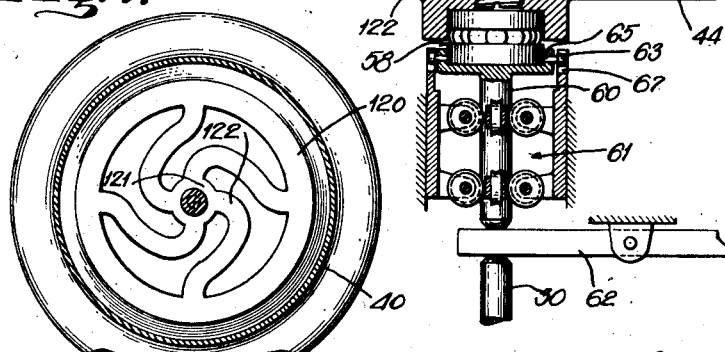
Fig. 4 is a cross-sectional view taken on the line 4—4 of Fig. 2.
Figure 3:
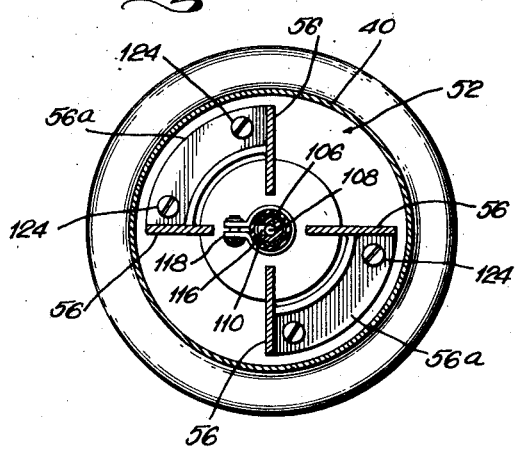
Fig. 3 is a section taken on line 3—3 of Fig. 2.

In some instances it may be desirable to employ a closed or sealed bellows, that is, one in which the bellows chamber is sealed off from the atmosphere, and in such instances the form of bellows device shown in Figs. 2 to 4 may advantageously be employed. In this embodiment the bellows 40 is attached to end members 42 and 44 as before, member 42 being attached to motor shaft 36 by set screw 46. In this instance, however, member 42 has secured to its under side, as by screws 104, a depending post 106 having a bore 108 which is in communication at one end with the vent bore 48 in shaft 36 and which is closed at its other end. Suitable packing prevents leakage between the base of post 106 and member 42. A series of holes 110 provides communication between the bore 108 and the surface of post 106. A tube 112 preferably of non-metallic material and having holes 114 registering with holes 110, fits over the post 106 and is surrounded by an imperforate sleeve 116 of thin soft rubber or other highly elastic material not affected by whatever liquid is used in the bellows. The assembly consisting of tube 112 and sleeve 116 is tightly clamped at both ends to post 106 by means of clamping rings 118. At its lower end post 106 is restrained against possible lateral vibration by a stabilizing member including a rim portion 120 secured to the periphery of member 44, a hub portion 121 secured to the free end of post 106 by a screw 123, and a plurality of curved arms or spokes 122. The spokes are substantially rigid in radial direction, but are flexible in axial direction so as to permit axial movement of the member 44. Member 44 is formed with a central opening in order to make the screw 123 accessible to a screw driver. This opening is normally closed by a fluid tight threaded plug 125.

In order to accommodate the central post assembly and to permit assembling of the several parts the fins or vanes 56 are in this case provided with base portions 56a removably attached by means of screws 124 to member 42, as shown in Fig. 3. The inner portions of the several fins are in this case cut away to provide clearance for the post assembly.

As in the previously described embodiment, the end member 44 is connected through the thrust bearing 58 to the guided pin 60 which acts on control lever 62 in opposition to the force applied by the diaphragm pin 30. In other respects the apparatus may be considered to be as shown in Fig. 1.

The operation of the apparatus just described is the same as that previously described in connection with Fig. 1, except that in this instance air is not permitted to come in contact with the liquid in the bellows chamber 52. In the present case this chamber is filled or substantially filled with liquid when the bellows is stationary, the elastic sleeve 116, which is in effect a diaphragm, in such case being supported against collapse by tube 112. When the bellows is in operation, so that the centrifugal force causes the liquid to axially expand the bellows and increase the volume of chamber 52, a vacuum would be created in the chamber if it were not for the sleeve 116. This sleeve is, however, exposed on its inner side to atmospheric pressure, by way of the bore 108 in post 106 and the holes 110 and 114. As a result the sleeve expands, to prevent creation of a vacuum, while at the same time sealing the liquid in the chamber against contact with the air and possible loss through evaporation. A certain amount of energy is required to expand the sleeve but this is so small as to be completely negligible, since in the first place the sleeve, which is supported against collapse by the lining tube, may be of very thin and highly elastic material, and in the second place the percentage by which the volume of chamber 52 is increased in normal operation is not large, so that the sleeve need not be highly stretched to compensate for the change in volume of the chamber. The sleeve 116 may of course be mounted directly on the post 106, but for convenience of assembly and replacement in case of damage or deterioration, it is advantageous to have it previously assembled on a rigid tube such as tube 112, to be slipped over and clamped upon the post 106.

Figure 5:
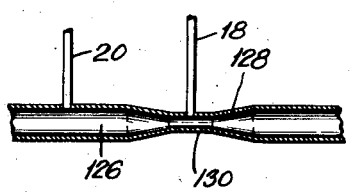
Fig. 5 is an elevation of a device usable in substitution for one of the devices shown in Fig. 1, in order to use the indicator for a different purpose.

As previously noted, the apparatus may be used for a variety of indicating purposes and as illustrative of these three is shown in Fig. 5, a conduit 126 through which fluid flows and which is provided with a venturi 128 for creating a differential pressure due to the flow of the fluid. In this case the neck or restriction 130 of the venturi is connected by pipe 18 to the chamber 22 of the diaphragm casing 28 while a section of larger diameter in the conduit is connected by pipe 20 to the chamber 24. Here again the differential pressure acting on diaphragm 26 is a square law function of the velocity of flow through the conduit, and such velocity may be indicated on the scale 96 in the manner heretofore described. In a case of this kind the indicator 98 shows volume of fluid passing through the conduit, rather than distance as in the case of a ship's log.

The embodiment illustrated in Fig. 6 is similar to that shown in Figs. 2 through 4, with the exception that a different form of elastic diaphragm is employed, and the stabilizing member is omitted. Reference character 200 designates a shaft which is supported axially and radially by spaced bearings 201 and 202 mounted in a bearing housing 203. Housing 203 is suitably secured to a horizontal member 204 which is carried by upright supports 205.

Integral with or suitably secured to the lower end of shaft 200 is an end member 206. The upper face of this member is formed with an annular depression 207 covered by an annular elastic diaphragm 208. The inner edge of the diaphragm is secured in fluid tight relation to the end member by means of a ring 209 and suitable bolts 210, while the outer edge of the diaphragm is secured by a ring 211 and bolts 212. The end member is provided with one or more passages 213 leading from the space 207 to the interior of the bellows, Filling passages 214 are also provided in the end member leading from the outside to the interior of the bellows and are provided with fluid tight plugs 215.

Suitably secured to the lower face of end member 206 is an annular plate 216 to which the upper end of the corrugated bellows member 217 is secured. The lower end of the bellows is secured to a circular end member 218. A plurality of vanes 219 are secured to arms 220, which in turn are fastened to the under side of end member 206 by means of bolts 221.

The outer face of lower end member 218 is provided with a threaded stud 222 to which is screwed a member 223. Member 223 carries the outer race of a ball bearing 224, the inner race of which is secured to the upper end of a sleeve 225. A vertical pin 226 is secured to a fixed base 227 and ball bearings 228 and 229 are disposed between the pin and the sleeve 225. The lower end of the sleeve is provided with stub shafts 230 which carry rollers 231. These rollers may bear against vertical surfaces formed on members 232 extending upwardly from the base 227.

Forked lever arm 233 is pivoted at 234 to the sleeve 225. This lever arm is mounted on a knife edge 235, and an adjustable stop 236 may be provided for limiting the upward movement of the left-hand end of the lever. A force proportional to the difference between the dynamic and static pressures of the Pitot member may be applied to the lever 233 in the same manner as shown in Fig. 1, namely, by means of the diaphragm 26 and pin 30.

The embodiment just described operates in substantially the same manner as the device shown in Fig. 2. When the shaft 200 is rotated as by the motor 34 in Fig. 1, the centrifugal force acting on the liquid contained in the bellows causes the latter to expand axially. The creation of a pressure within the bellows substantially less than atmospheric is prevented by the flexible diaphragm 208 in the same manner as is done by the diaphragm 116 in Fig. 2. The axial expansion of the bellows causes the end plate 218 and the member 223 to be moved downwardly. This in turn causes a like movement of the bearing 224 and the sleeve 225. Rotation of the sleeve is prevented by the rollers 231 contacting the vertical surfaces on the members 232, the rollers rolling on the surfaces as the sleeve 225 is moved axially. Relative rotation of the bellows and the member 223 with respect to the sleeve is permitted by the bearing 224. Vertical movement of the sleeve 225 causes pivoting of the lever 233 about the knife edge fulcrum 235.

Inasmuch as the diaphragm 208 is located outside of the bellows it may be readily inspected for leaks and, in the event that it is necessary to replace it, this may be done without disassembling the bellows.

The provision of the spaced bearings 201 and 202 for the shaft 200, together with the spaced bearings 228 and 229 between the pin 226 and the sleeve 225, assures that the upper end member 206 and the lower end member 218 are maintained in axial alignment and consequently a stabilizing member such as is shown at 120 in Fig. 2 is not required for this purpose.

It will be evident that many changes and variations may be made in the apparatus heretofore described without departing from the present invention, the scope of which embraces all forms of apparatus falling within the purview of the appended claims.

What is claimed:

1. In apparatus of the character described means for producing a force indicative of the flow of a fluid to be measured, a variable speed motor, a liquid containing bellows driven by said motor and axially expansible due to centrifugal force acting on the liquid when the bellows is revolved, means for causing force produced by expansion of said bellows to oppose the force produced by the first mentioned means, regulating means for controlling the speed of operation of said motor to balance the opposed forces and speed responsive indicating means responsive to the speed of operation of said motor.

2. In an indicator of the character described a diaphragm, means for applying to said diaphragm, a differential pressure indicative of the flow of a fluid to be measured, a variable speed motor, a liquid containing bellows driven by said motor, said bellows being axially expansible due to centrifugal force acting on the liquid when the bellows is revolved, means for causing force due to expansion to said bellows to oppose the force produced by the differential pressure on said diaphragm, regulating means for controlling the speed of said motor to balance said forces and speed responsive indicating means responsive to the speed of operation of said motor.

3. In a ship's log, a diaphragm member having a diaphragm and pressure chambers separated by said diaphragm, a Pitot member for transmitting static water pressure to one of said chambers and combined static and dynamic water pressure to the other of said chambers, whereby to produce a resultant force on said diaphragm indicative of the dynamic head created by movement of the ship through the water, a variable speed motor, a liquid containing bellows driven by said motor, said bellows being axially expansible due to centrifugal force acting on said liquid when the bellows is revolved, means for causing force produced by expansion of said bellows to oppose force produced by said dynamic head on said diaphragm, regulating means controlling the speed of operation of said motor to balance the opposed forces and a speed responsive indicator responsive to the speed of operation of said motor.

KNUTE ARNOLD HOLST.